Nov. 11, 1952 H. M. SCHWEIGHOFER ET AL 2,617,313
SHAFT MULTIPOSITIONING DEVICE
Filed Jan. 26, 1950 2 SHEETS—SHEET 1

INVENTORS
GORDON E. NICHOLSON
ROSS S. PYLE
HORST M. SCHWEIGHOFER
By Marvin Moody
ATTORNEY Nov. 11, 1952 H. M. SCHWEIGHOFER ET AL 2,617,313
SHAFT MULTIPOSITIONING DEVICE
Filed Jan. 26, 1950 2 SHEETS—SHEET 2

INVENTORS
GORDON E. NICHOLSON
ROSS S. PYLE
HORST M. SCHWEIGHOFER
By Marvin Moody
ATTORNEY Patented Nov. 11, 1952

2,617,313

UNITED STATES PATENT OFFICE 2,617,313

SHAFT MULTIPOSITIONING DEVICE

Horst M. Schweighofer, Gordon E. Nicholson, and Ross S. Pyle, Cedar Rapids, Iowa, assignors to Collins Radio Company, Cedar Rapids, Iowa, a corporation of Iowa Application January 26, 1950, Serial No. 140,592

6 Claims. (Cl. 74—565)

1

This invention relates in general to a control apparatus for the positioning of a shaft to a plurality of positions, and in particular to a positive detent action in combination with a shaft control system.

It is an object of this invention to provide a stop-wheel detent pawl which is positively held out of engagement with the teeth of the stop-wheel during the change of position step in the cycle of operation.

A further object of this invention is to provide a locking means for a detent pawl for a shaft positioning device which will positively prevent the pawl from being disengaged from the stop-wheel by friction.

Yet another object of this invention is to provide a multi-positioning shaft control device which is easy to manufacture and operate and which will positively maintain a shaft in a set position.

A feature of this invention is found in the provision for a toothed stop-wheel which has the teetth spaced about the periphery of the wheel such that each tooth position corresponds to a particular shaft position. A pivoted pawl has a stop-wheel engaging portion which is received between the teeth of the stop-wheel for preventing relative motion thereof. A pivoted locking arm has a pawl engaging portion which receives a retaining pin attached adjacent the free end of the pawl for preventing the stop-wheel from forcing the tooth-engaging portion of the pawl out of engagement with the teeth. Electromagnetic actuating means control said locking arm such that the locking arm is in the pawl locked position when the armature of the electromagnetic means is not actuated, and the locking arm is in the unlocked position when the armature of the electromagnetic means is energized. When the locking arm is in the unlocked position, the pawl is held out of engagement with the stop-wheel by the locking arm.

Further objects, features, and advantages of this invention will become apparent from the following description and claims when read in view of the drawings, in which;

2 spatial relationship of the members when the stop-wheel is in the unlocked position.

Figure 1:
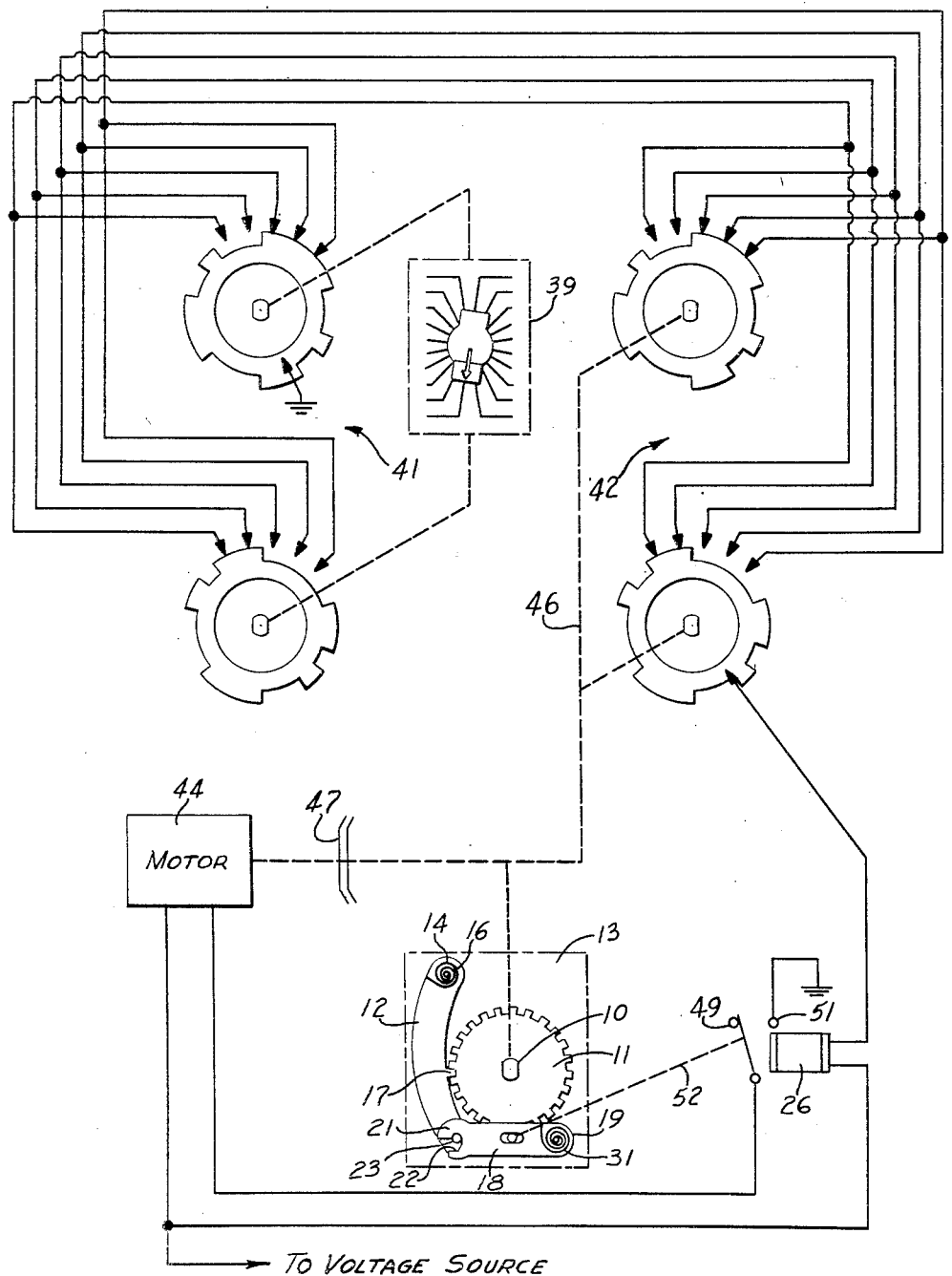
Figure 1 is a schematic illustration of the multipositioning shaft control device of this invention.

Referring to Figure 1, it is desired to control the angular position of the shaft 10. The shaft 10, may be, for example, connected to a multiposition switch which connects various values of impedance in a circuit in response to rotation of the shaft 10. A toothed stop-wheel 11 is carried on shaft 10 and shaft 10 is pivotally supported on base plate 13. A pawl 12 is also pivotally supported on the base plate 13 adjacent its end 14. As shown in Figure 1, pawl 12 is always urged toward the stop wheel 11 by spring means 16. A tooth-engaging portion 17 extends transversely from the pawl 12 intermediate its ends, and is of such a shape that rotation of the stop wheel 11 will tend to force the pawl 12 in a clockwise direction with reference to Figure 1.

A stop arm 18 is pivotally supported on the plate 13 adjacent its end 19. The opposite end 21 of the locking arm is formed with a crescent shaped opening 22 for engaging therein a pin 23, carried on the pawl 12. The end 21 is generally G-shaped.

Figure 2:
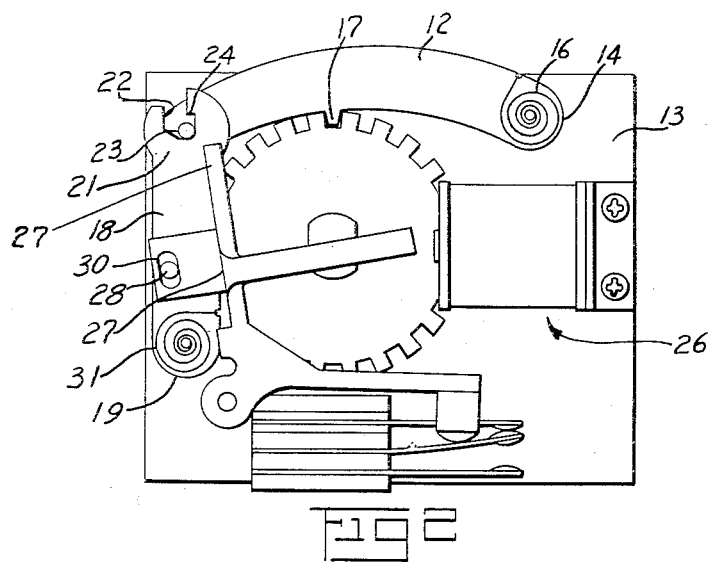
Figure 2 is a detailed view of the locking arm in combination with the stop-wheel and pawl of this invention, showing the relative spatial relationship of the parts when in the locked position; and, Figure 3 is a detailed illustration of the relative

Referring to Figure 2, the pin 23 is seen when it is in its locked position relative to the locking arm 18. In the locked position, when an attempt is made to rotate stop wheel 11, the pawl arm 12 is cammed slightly upwardly by friction on the engaging portion 17 and the pin 23 engages the stop portion 24 adjacent the end of the locking arm 18. Thus the stop wheel is positively prevented from rotating.

Electromagnetic means designated generally as 26 and which may be, for example, a relay with a movable armature is connected to the base plate 13 and the armature 27 of the relay is connected to the locking arm 18 by means including a pin 28 which is received in a longitudinal opening 30 in the armature 27. Upon energizing the relay 26, the armature 27 moves from its open position illustrated in Figure 2 to its closed position illustrated in Figure 3. It is to be observed that the locking arm 18 is pivoted clockwise, relative to Figure 3, when the relay is energized and the stop portion 24 no longer prevents the pawl 12 from moving upwardly.

Figure 3:
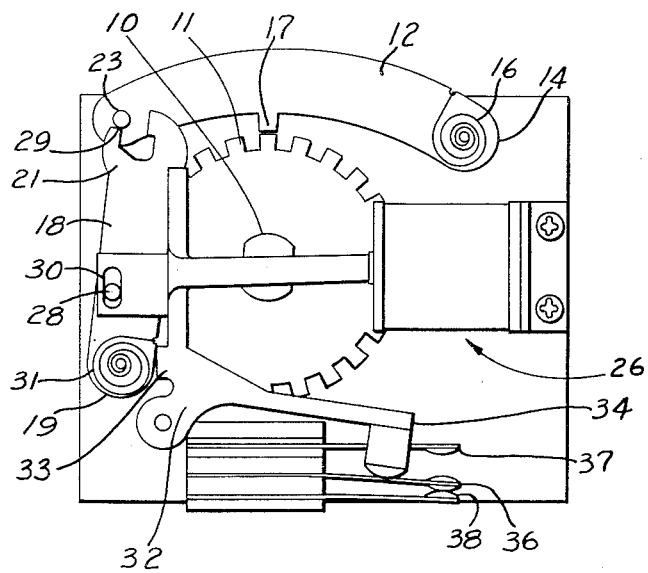

When the relay is in the energized position, as illustrated in Figure 3, the teeth of the stop wheel 11 may easily cam the engaging portion 17 of the pawl 12 from its position of engagement. Pawl 12 is raised until the pin 23 is engaged by a stop 29 adjacent the end of locking arm 18. The pin is cammed upwardly out of engagement with the teeth by locking arm 18 because of the curvature of the pin. This detent action holds the pawl 12 out of engagement with the stop wheel 11 until the relay is de-energized.

When the relay is de-energized, a spring 31 connected about the pivot 19 and to the locking arm 18 urges the stop arm 18 in a counter clockwise direction, with respect to Figure 2, and pawl 12 is allowed to drop into the opening 22 and the engaging portion 17 falls between a pair of teeth and thus holds the stop wheel 11. The locking portion 24 of the arm 18 once again prevents the pawl 12 from being cammed out of the locked position. An arm 32 is pivotally supported on the base plate 13 in a position adjacent the locking arm 18 and is an extension of armature 27 and rotates with it. Arm 32 has an extending portion 34 adjacent its free end for moving a spring contact 36 between a pair of contacts 37 and 38. Thus when the locking arm 18 is in the locked position, pawl 32 forces the contact 36 to engage the contact 37 and when the locking arm 18 is in the unlocked position the contact 36 engages the contact 38.

Referring once again to Figure 1, the apparatus of this invention is shown in combination with a driving means, position selection means, and a control circuit. The control circuit may be, for example, such as the one described in Patent No. 2,476,673 which issued to R. W. May and Horst Schweighofer on July 19, 1949 and which is entitled Shaft Positioning Control System. It is to be understood, of course, that any other control circuit which is designed to actuate a relay in response to the relative positions of a selector switch with respect to a shaft may be used. The particular control circuit illustrated comprises a selector switch 39 which may be moved to a plurality of positions either manually or by master switching means. A pair of wafer switches designated generally as 41 and 42, are of the wafer type and are well known to those skilled in radio art. The switches 41 and 42 are electrically connected and switches of this type have the characteristic that when the selector switch 41 is set in response to the selector knob 39, the seeking switch 42 will find an open circuit when rotated by a suitable driving means. A driving means, which in the instant case is the motor 44, is connected in series with the contacts 36 and 38, and rotates the switch 42 by the mechanical linkage 46. The relay control circuit will be broken when the position of switch 42 corresponds to the position of switch 41, thereby opening the motor control circuit by opening contacts 36 and 38.

The motor 44 is mechanically linked to the stop wheel 11 and to switch 42 through a slip clutch 47.

When the selector switch 41 is in the same position as the switch 42 an open circuit exists in the relay control line and the armature of the relay 26 is not energized. When, however, the selector switch 41 is moved by rotating the selector 39, a completed circuit exists and the armature of the relay 26 will be moved from the open circuit position 49 to the closed circuit position 51. This causes the motor control circuit to actuate the motor and causes it to drive the seeking switch 42 and stop wheel 11. It is to be noted that when the relay is energized, the locking arm 18 is moved by mechanical linkage 52 from the locked to the unlocked position. The locking arm 18 is retained in the unlocked position as long as the relay 26 is energized, and when the open circuit occurs in the control circuit the relay is de-energized and the locking arm allowed to move to the locked position.

While this invention has been described with respect to a particular control system, it is to be understood that there are numerous control circuits which may be used to control the shaft positioning apparatus of this invention.

Although this invention has been described with respect to preferred embodiment thereof, it is not to be so limited since changes and modifications may be made therein which are within the full intended scope of the invention as defined by the appended claims.

We claim:

1. In a shaft positioning system having selecting means, driving means, and control means, shaft retaining means comprising a toothed stop-wheel carried on the shaft, a base plate, a pivoted lever connected to said base plate, a stop extending transversely from the lever and engageable between a pair of teeth on the stop-wheel, a holding pin adjacent the free end of the lever a locking arm pivotally supported on the base plate, flexible means pivotally supported on the base plate urging the lever toward said locking arm, the free end of said locking arm formed in a G-shaped portion, the holding pin receivable by said G-shaped portion and locked thereby when the locking arm is in a first position and unlocked when the locking arm is in a second position, flexible means urging said locking arm toward the first position, and electromagnetic means connected to the locking arm to move it from the first to the second position.

2. A system according to claim 1 wherein the electromagnetic means is connected to the locking arm by means including mechanical linkage connected to a movable portion of the electromagnetic means, a pin adjacent the end of said mechanical linkage, a longitudinal slot formed in said locking arm intermediate the ends, and said pin received within said slot.

3. In a system for controlling the position of a shaft, shaft locking means comprising, a toothed stop-wheel carried on said shaft, a pawl formed with a tooth-engaging portion pivotally supported adjacent said stop-wheel and movable so that said tooth-engaging portion engages said stop-wheel, a pin mounted on said pawl transversely thereof, a locking arm pivotally supported and engageable with said pin, said locking arm formed with an under-cut slot adjacent its free end for receiving said pin therein, and actuating means for controlling the position of said locking arm.

4. In a system for controlling the position of a shaft comprising, a toothed-stop wheel mounted on said shaft, a pawl pivotally supported adjacent said stop-wheel, a tooth-engaging portion extending from said pawl and engageable with the teeth of said stop-wheel, a pin mounted transversely of said pawl adjacent its free end, a locking pawl pivotally supported with its free end engageable with said pin, said free end formed into a generally G-shaped portion for engaging said pin to lock said pawl in a tooth-engaged position, and actuating means for controlling the position of said locking arm.

5. In a system for controlling the position of a shaft comprising, a toothed stop-wheel mounted on said shaft, a pawl pivotally supported adjacent said stop wheel, a tooth-engaging portion extending from said pawl and engageable with the teeth of said stop wheel, a pin mounted transversely of said pawl adjacent its free end, a locking pawl pivotally supported with its free end engageable with said pin, said free end formed into a generally G-shaped portion for engaging said pin to lock said pawl in a tooth-engaged position, actuating means controlling the position of said locking arm, first flexible means connected to said locking arm and urging the G-shaped portion into a locked position with respect to said pawl, and second flexible means connected to said pawl and urging it against said stop wheel.

6. Means for controlling the position of a shaft comprising, a toothed-stop wheel mounted on said shaft, a pawl pivotally supported adjacent said shaft, a tooth-engaging portion extending from said pawl and engageable with said toothed stop wheel, a locking arm pivotally supported adjacent said pawl, the free end of said locking arm generally G-shaped, a pin mounted transversely of said pawl and engageable with said G-shaped portion, said G-shaped portion formed with a stop portion, and said pin receivable within said G-shaped portion and engageable against said stop portion in a locked position, and actuating means controlling said locking arm to cam said pin out of the locked position to move it to an unlocked position.

HORST M. SCHWEIGHOFER.
GORDON E. NICHOLSON.
ROSS S. PYLE.

REFERENCES CITED

The following references are of record in the file of this patent:

UNITED STATES PATENTS

| Number | Name | Date |
| --- | --- | --- |
| 337,583 | Himmer | Mar. 9, 1886 |
| 720,683 | Dunn | Feb. 17, 1903 |
| 920,300 | Fallek | Mar. 4, 1909 |
| 2,334,724 | Praessler | Nov. 23, 1943 |
| 2,476,673 | May et al. | July 19, 1949 |

FOREIGN PATENTS

| Number | Country | Date |
| --- | --- | --- |
| 523,942 | France | Aug. 27, 1921 |